(12) United States Patent
Huang et al.

(10) Patent No.: US 10,254,487 B2
(45) Date of Patent: Apr. 9, 2019

(54) ALL-IN-ONE FIBER OPTIC CONNECTOR INSPECTION PROBE WITH EMBEDDED WEB SERVER AND WIRELESS TRANSMITTER

(71) Applicant: LIGHTEL TECHNOLOGIES, INC., Renton, WA (US)

(72) Inventors: Shangyuan Huang, Seattle, WA (US); Ge Zhou, Renton, WA (US); Jyejong Wang, Sammamish, WA (US); Ray Chen, Seattle, WA (US); Peifeng Zeng, Shanghai (CN)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 469 days.

(21) Appl. No.: 15/057,087

(22) Filed: Feb. 29, 2016

(65) Prior Publication Data

US 2016/0291257 A1     Oct. 6, 2016

Related U.S. Application Data

(60) Provisional application No. 62/139,804, filed on Mar. 30, 2015.

(51) Int. Cl.
*G02B 6/38*     (2006.01)
*G01M 11/00*    (2006.01)
(Continued)

(52) U.S. Cl.
CPC .............. *G02B 6/385* (2013.01); *G01M 11/33* (2013.01); *G02B 21/0004* (2013.01);
(Continued)

(58) Field of Classification Search
CPC ................ G02B 6/385; G02B 21/0004; G02B 21/0008; G01M 11/03
See application file for complete search history.

(56) References Cited

U.S. PATENT DOCUMENTS 9,217,688 B2    12/2015   Levin et al.
2011/0085159 A1*  4/2011  Levin ..................... G01M 11/30
                                                         356/73.1
(Continued)

*Primary Examiner* — Obafemi O Sosanya
(74) *Attorney, Agent, or Firm* — Pai Patent & Trademark Law Firm; Chao-Chang David Pai

(57) ABSTRACT

A fiber optic connector endface inspection probe includes a microscope system, a camera module, and an image processing system. While the objective lens of the microscope system is being moved towards and past the focused position for the endface of a mated connector, either by manually turning a focusing knob in one direction or via an automatic transmission mechanism, the camera module continuously takes and sends endface images to the image processing system, wherein a microprocessor continuously monitors the sharpness of the endface images to acquire a focused image and analyze it to make an endface inspection pass/fail judgment, without using an external display to monitor the endface images. The microprocessor further comprises an embedded web server for converting endface images and inspection report into web pages to be transmitted by a wireless transmitter of the image processing system to external devices for optional monitoring or manual inspection.

18 Claims, 6 Drawing Sheets

(51) Int. Cl.
 *G02B 21/00* (2006.01)
 *G02B 21/36* (2006.01)
 *G02B 21/24* (2006.01)

(52) U.S. Cl.
 CPC ........ *G02B 21/0008* (2013.01); *G02B 21/244* (2013.01); *G02B 21/365* (2013.01)

(56) References Cited

U.S. PATENT DOCUMENTS

| | | | | |
|---|---|---|---|---|
| 2011/0145881 A1* | 6/2011 | Hartman | ........... | H04N 7/15 725/118 |
| 2014/0327756 A1 | 11/2014 | Huang et al. | | |
| 2015/0278639 A1* | 10/2015 | Leighton | ........... | G02B 6/02 382/155 |

* cited by examiner

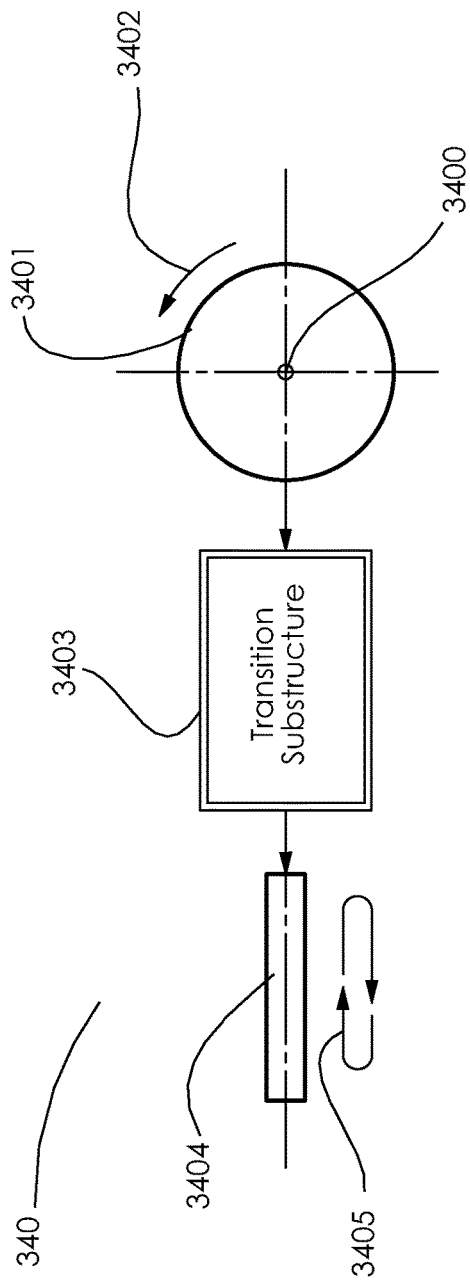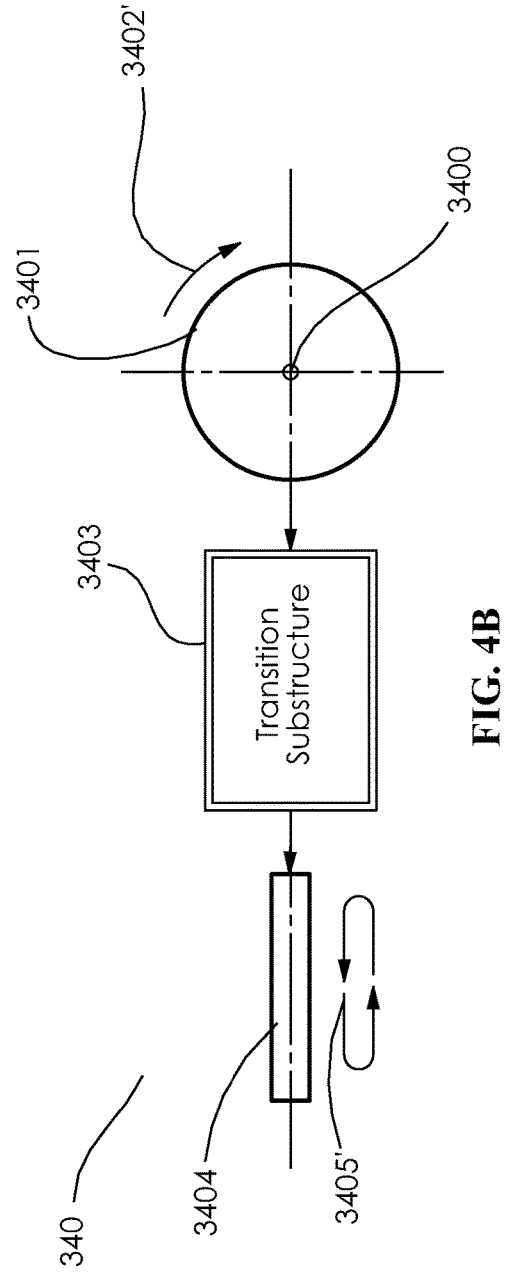

ALL-IN-ONE FIBER OPTIC CONNECTOR INSPECTION PROBE WITH EMBEDDED WEB SERVER AND WIRELESS TRANSMITTER

BACKGROUND OF THE INVENTION

I. Field of the Invention

This invention relates generally to inspecting fiber optic connector endfaces using video microscopes. More specifically, the invention relates to an all-in-one fiber optic connector endface inspector that can rapidly complete entire inspection process without needing a display monitoring and locating the optical system of the microscope to the focused position for the connector endface.

II. Background

It is important in any fiber optic communication system that every optical fiber connector used in the system be inspected and cleaned prior to mating. Various types of hand-held video microscopes for inspecting connector endfaces have been produced over a decade. A typical hand-held inspector set consists of a microscope probe and a display unit connected through a cable. By monitoring the video image of the fiber endface on the display screen, the operator can adjust the focusing knob on the microscope probe to find the focused position for the fiber endface. A focused image can be captured and stored in the display; then, the display (often possessing a CPU inside) may conduct further 'intelligent' tasks, such as locating the fiber position in the image, indicating its ABCD zones (see ABCD-zone definitions in the international standard IEC 61300-3-35), and finally making its endface pass/fail judgment (based on the IEC 61300-3-35 criteria).

The U.S. Patent Application Publication by Huang et al, US20140327756 A1, provides a wireless microscope inspector in which the microscope probe wirelessly transmits video streaming in real-time to the target display through Wi-Fi. Eliminating the wire/cable between the microscope probe and the display allows more user-friendly operations. Another very important advantage of the wireless inspection lies in its wider display compatibility. In a wired approach, the display must have a port that matches the probe-specific cable plug and the display's operating system must work with the probe-specific communication protocol. But in a wireless case, any display device with Wi-Fi client functionality can receive the video signals from the wireless probe. The wide choices of displays include iOS devices (iPhone, iPad, and iPod), Android tablets, smart phones, smart TVs, PCs or special testing devices, etc. Yet, strictly speaking, such display compatibility is still not fully satisfactory. Since the 'intelligent' tasks mentioned above are conducted inside the display, different kinds of display operating systems (e.g. iOS versus Android) would require different application software designs. Even for different revisions of each kind of OS, the software could also be different.

To completely eliminate the display compatibility concerns, a useful solution is to include a microprocessor in the microscope probe so that the microscope probe itself can complete all the 'intelligent' tasks on the spot. In this case, the only functions of a display would be just receiving (via Wi-Fi) and showing: (a) the fiber endface images (for operators to monitor their focusing process) and (b) the final analysis reports. No more specific calculation software is needed in the display then.

Further, if the focusing of the fiber endface can be automatically done without monitoring and also the Pass/Fail result can be directly indicated on the probe (e.g. through a green/red LED), a display unit would virtually become unnecessary. Levin et al proposed such a probe in their U.S. Pat. No. 9,217,688 B2. In that patent, two software-controlled autofocusing approaches were proposed, either by moving the lens position or by adjusting the shape of a liquid lens. But in order to drive the lens movement or drive the liquid lens shape change, a motor with a controller or an electronic voltage controller must be built in the probe. With these extra components and functions, the probe's internal structure becomes rather complicated. Moreover, due to the extra power consumption (meaning a more powerful battery), the whole probe ends up fairly bulky and heavy.

Another concern about this autofocus approach is that the back-and-forth searching process for the optics of the microscope probe to locate the best focus position requires a steady handling of the probe. When inspecting a female connector, if the operator's hand is not stable enough, the time to settle the optics at the focused position could take tens of seconds.

Thus there is a need for a compact, lightweight, smart all-in-one probe, which can efficiently perform fiber connector enface inspection without a back-and-forth focusing process and independently of any display for an operator to monitor the process.

BRIEF SUMMARY OF THE INVENTION

The fiber optic connector endface inspection probe according to the present application includes a microscope system, a camera module, an image processing system, and an adapting tip at a front side of the microscope system for mating with an external fiber optic connector to be inspected.

The inspection probe may be run either in an automatic inspection or a manual inspection mode. Under the automatic inspection mode, the inspection probe may be set to the single-mode for single-mode fibers or to the multimode for multimode fibers. Under the automatic inspection mode, while the objective lens of the microscope system is being moved towards and past the focused position, either by manually turning a focusing knob in one direction (i.e. clockwise or counter-clockwise) or via an automatic transmission mechanism, the camera module continuously takes and sends endface images of the mated fiber optic connector to the image processing system, wherein a microprocessor continuously monitors the sharpness of the endface images to acquire a focused image and further analyze it to make an endface inspection pass/fail judgment. The automatic inspection mode may be performed to yield a focused endface image and an inspection report without a need of an external display for an operator to monitor the endface images. During the automatic inspection mode, an LED status indicator will indicate the status of the process using varying colors or lighting patterns.

The microprocessor further comprises an embedded web server for converting the endface images received and the inspection report into web pages, which will then be transmitted by a wireless transmitter of the image processing system to external devices for monitoring under the automatic inspection mode, if desired, or under the manual inspection mode. Because the endface images and inspection report transmitted by the wireless transmitter are already in the format of web pages, no specialized application software is required of the external device to read and display the endface images and inspection report.

Under the manual inspection mode, usually for connectors which cannot be analyzed as standard single-mode or multimode connectors, the microprocessor does not monitor the sharpness of the endface images received to identify a focused image; the operator will visually inspect the stream of the endface images to manually find the focused image and make the endface pass/fail judgment.

BRIEF DESCRIPTION OF THE DRAWINGS

The present invention will be described in detail with preferred embodiments in conjunction with the following drawings:

FIG. 4A and FIG. 4B illustrate a focusing/transmission mechanism that converts a one-way rotary motion into a linear bi-directional reciprocating motion.

DETAILED DESCRIPTION OF THE INVENTION

The present invention provides a compact smart all-in-one fiber optic endface inspection probe. It can complete fiber endface inspections automatically, readily, free of display monitoring, and free of human judgments as to microscope focusing and endface quality.

Figure 1:
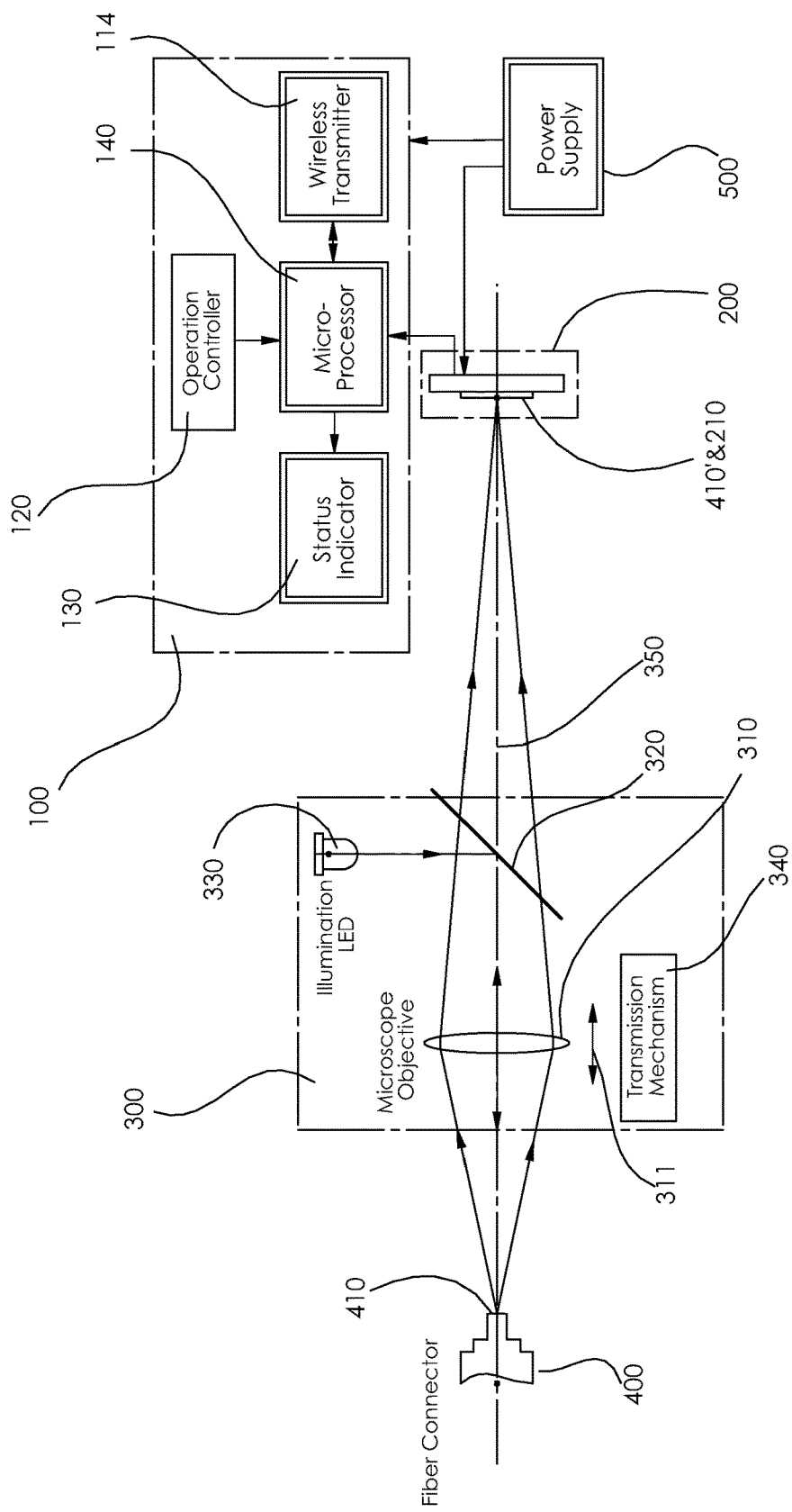
FIG. 1 shows the major functional blocks of the inspection probe according to the present invention.

FIG. 1 illustrates the new smart inspection probe according to the present application, which comprises three key functional blocks: block 100 (an intelligent image processing system), block 200 (a digital camera module), and block 300 (a microscope system). Respectively, the block 300 is optically related to block 200, while block 200 is electronically linked to block 100. A power supply 500 (e.g. battery) supplies electrical power to all three blocks.

As illustrated in FIG. 1, the functional block 300, representing the microscope system 300, includes an optical system (which typically includes an objective lens 310 and a beam-splitter 320) and a transmission mechanism 340 for driving the optical system to move the objective lens 310. The endface 410 of a fiber optic connector 400 is placed in front of the smart all-in-one inspection probe to be inspected. Through the objective lens 310 of the microscope system 300, a focused image 410' of the endface 410 is obtained. An illumination LED 330 and the beam-splitter 320 are disposed in the functional block 300 for illuminating the connector endface 410. The objective lens 310 is forward/backward adjustable along the optical axis 350 within a certain range 311. This range 311 covers the focused position where the focused image 410' of the endface 410 just falls onto the camera sensor surface 210 of the camera module 200, as shown in FIG. 1. For a normal design, this focused position is located substantially in the middle of the adjustment range 311 of the objective lens 310.

Figure 2A:
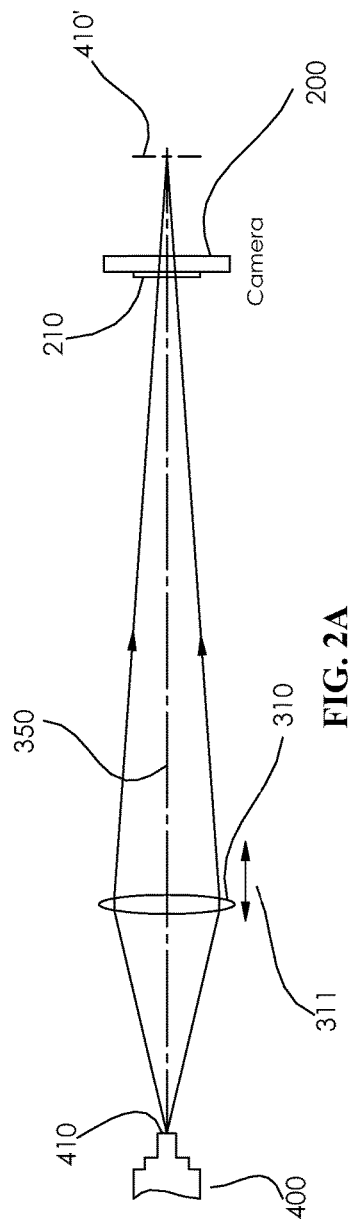
FIGS. 2A/2B/2C illustrate the formation of the endface image on the camera module of the inspection probe in relation to three different positions of the objective lens of the microscope system.
Figure 2B:
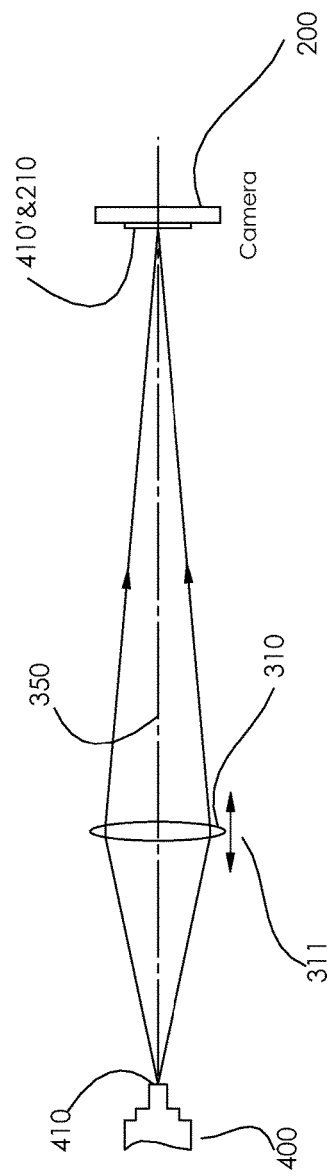
Figure 2C:
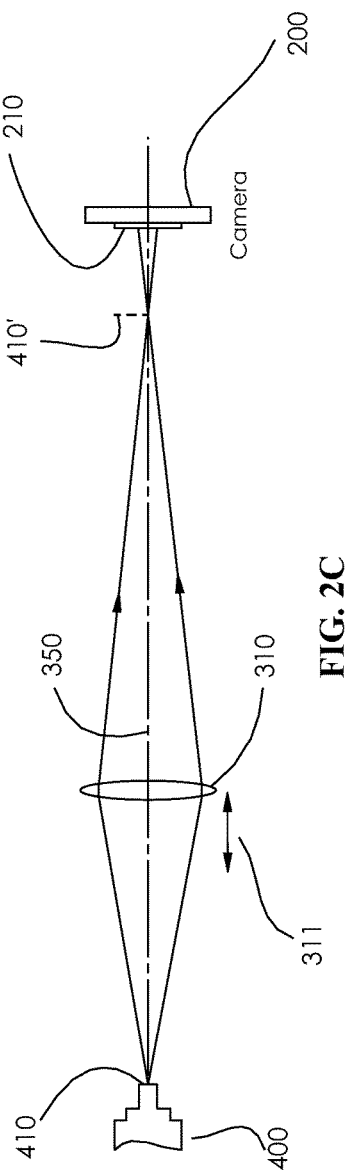

As shown in FIG. 1, the microscope system 300 includes an optical system and a transmission mechanism 340. For any given positions of the object (i.e. the endface 410) and the camera sensor surface 210, FIG. 2 illustrates how the focused image 410' evolves in its location with the movement of the lens 310. FIG. 2B corresponds to the focused position where the focused image 410' coincides with the camera sensor surface 210. FIG. 2A and FIG. 2C respectively correspond to a forward or a backward position of the objective lens 310 relative to the focused position. As shown in these two figures, the focused image 410' of the endface 410 falls behind or ahead of the camera sensor surface 210 respectively; in other words, the camera module 200 receives unfocused blurry images at these positions. So it can be seen that, with the movement of objective lens 310 from FIGS. 2A to 2C, the sharpness of the images received by the camera module 200 experiences a low-high-peak-high-low course.

Back to FIG. 1, an intelligent image processing system (i.e. functional block 100) is connected to the camera module 200. The image processing system 100 continuously receives endface image signals from the camera module 200. A microprocessor 140 is responsible for the entire automatic inspection processing, from acquiring a focused image up to image analysis and Pass/Fail judgment. Considering possible needs of using an external display device to monitor the images, the image processing system 100 also includes a wireless transmitter 114 that is responsible for wirelessly sending video streams, fixed image frames, and/or analysis reports to the external display device. The operation controller 120 represents all switches and buttons on the inspection probe for operation controls, while the status indicator set 130 represents all the LED lights on the inspection probe for status indications. Their detailed functions will be described later.

Figure 3:
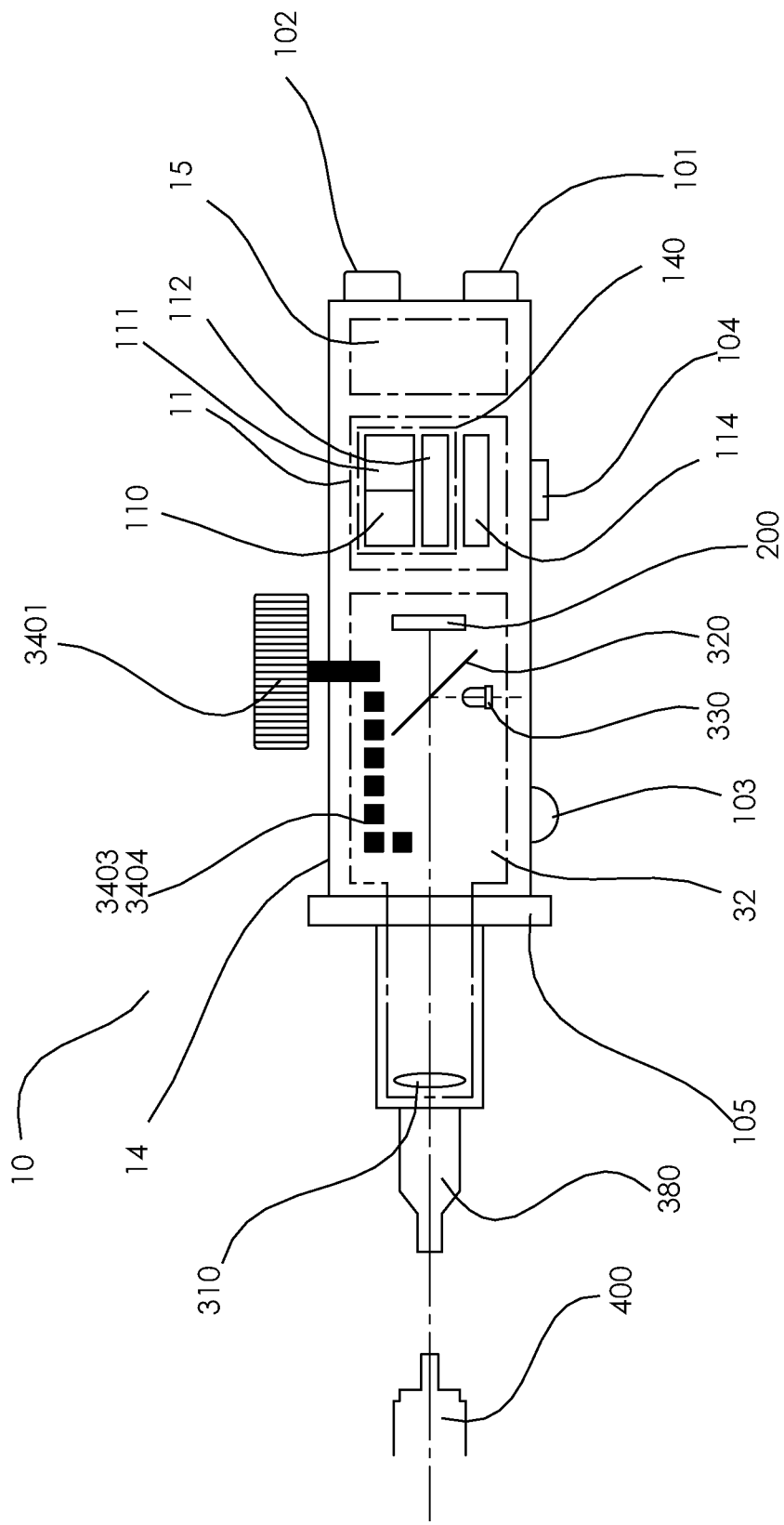
FIG. 3 illustrates the physical structure and components of the inspection probe that embodies the functional blocks shown in FIG. 1.

FIG. 3 shows an example of the structure of a smart all-in-one inspection probe 10 according to the present application. Similar to conventional inspection probes, the inspection probe 10 includes a probe enclosure 14, a connector adapting tip 380, mechanical frames (not shown) for holding optic and electronic parts, a focusing knob 3401, a transmission substructure 3403 connected to a mechanical lens drive bar 3404. In this embodiment, the focusing knob 3401, the transmission substructure 3403 and the mechanical lens drive bar 3404 altogether correspond to the transmission mechanism 340 shown in FIG. 1 for driving the movement of the objective lens 310. The internal zone 32 in the inspection probe 10 corresponds to the functional block 300 (i.e. the microscope system) and the functional block 200 (i.e. the digital camera module) shown in FIG. 1, while the internal zone 11 includes the microprocessor 140 as well as the wireless transmitter 114 of the functional block 100 (i.e. the intelligent image processing system). The microprocessor 140 includes a CPU (central processing unit) 110, a memory 111, and an embedded web server 112. The battery 15, corresponding to the power supply 500, is disposed at the back of the inspection probe 10 to supply electrical power to the image processing system 100, the camera module 200, as well as all the LEDs (including those for the status indicator set 130 and the illumination LED 330).

Note that the operation controller 120 in the functional block 100 in FIG. 1 corresponds to the power switch 101, the mode selection switch 102, the Wi-Fi on/off switch 104, and the micro-touch multifunctional switch 103 shown in FIG. 3. Certainly, the operation controller 120 may include other switches or buttons for operation controls.

It should be emphasized that, in the microprocessor 140, the embedded web server 112 converts the output signals in a webpage format, such as HTML, HTML5, JavaScript, etc. With webpage compliance, all video streams, fixed image frames, and analysis reports transmitted from the wireless transmitter 114 can be easily received and displayed by an external electronic device without needing any additional specialized application software, no matter what the operating system the electronic device has as long as it can read and display web pages.

The operator can select either an automatic inspection mode or a manual inspection mode for the inspection probe 10 by using the mode selection switch 102. Its automatic inspection process under the automatic inspection mode is described as follows.

(1) Turn on the power switch 101 and it is lit indicating the probe Power ON status.

(2) Based on the fiber type in the connector 400 to be inspected, set the mode selection switch 102 to the 'SM' mode (for single-mode fibers) or the 'MM' mode (for multimode fibers). Since some special connectors or special scenarios may not fit to a popular SM or MM connector category, a 'manual' inspection mode is also available on the mode selection switch 102, which will be described later.

(3) Make sure that a correct connector adapting tip 380 has been installed on the inspection probe 10, which matches the type and status (male or female) of the connector 400, and then mate the connector adapting tip 380 with the connector 400.

(4) Press the micro-touch multifunctional switch 103 on the inspection probe 10 to initiate an automatic inspection process—upon pressing the multifunctional switch 103, the LED status indicator 105 (e.g. a ring-shaped LED shown in FIG. 3), which is a part of the status indicator 130 shown in FIG. 1, starts blinking (say, in a blue color) indicating that it is in the process of acquiring a focused image of the fiber endface 400.

(5) Manually rotate the focusing knob 3401 in one direction, either clockwise or counter-clockwise. (With the rotation, the microprocessor 140 is continuously monitoring the focusing status, e.g. by calculating the image sharpness index for each image received.) Once the rotation passes the point with a peak image sharpness, a buzzer sound is triggered, indicating that a focused endface image is already acquired. In the meantime, the LED status indicator 105 also changes to a steady lighting (say, in the same blue color). Now, the operator can go ahead relax his/her hand and pull the inspection probe off the connector 400. It may be envisioned that manual turning of the focusing knob 3401 in this step may be replaced with an automatic, electrically driven transmission mechanism, whereby the objective lens 311 is automatically moved in the range 311 without manually turning the focusing knob 3401. However, such an automatic transmission mechanism will undoubtedly increase the weight and power consumption for the inspection probe 10. Nevertheless, an automatic transmission mechanism may be adopted when the situation allows.

(6) In a moment, the microprocessor 140 finishes the fiber ABCD zone locations as well as the Pass/Fail judgment per IEC standards (as either for SM fiber or for MM fiber, as selected in step 2). If the judgment result is a pass, the LED status indicator 105 turns to green; whereas if the judgment result is a fail, the LED status indicator 105 turns to red. In the meantime, a final focused fiber-endface picture, cropped from the acquired focused image, is created by the microprocessor 140. It covers the fiber ABCD zones with the fiber in the center of the picture. Also, an inspection report is created, including the final focused endface picture with all the analysis data such as the inspection criteria, defect details, etc.

(7) A new inspection can be initiated by pressing the micro-touch multifunctional switch 103.

Note that the colors and patterns of the LED lighting indicating the various operating stages above are simply illustrative and not limiting examples. Other colors and lighting patterns can be chosen for the inspection probe 10 according to the present application.

Various image sharpness index functions have been proposed in the literature. Erteza (Appl. Opt., 1976 Apr. 1; 15(4):877-81) introduces a sharpness index function, derived from the intensity distribution in an image aberrated by a quadratic-curvature wavefront distortion, and shows it to be very effective as a measure of the correctness of focus. However, the image sharpness index used in the inspection probe 10 of present invention is not limited to any particular sharpness index.

It is worth mentioning that although the automatic inspection process under the automatic inspection mode does not require monitoring, the operator can still monitor the inspection process if preferred. As long as the wireless connection is available, the external electronic device will continuously receive and show the endface images as a video stream while the focused endface image is being acquired in step (5). The external electronic device may also receive the final focused endface image and the inspection report. All the endface images and the inspection report will be displayed as web pages on the external device; moreover, the focused endface image will be displayed with a window to allow the operator to enter his/her notes or comments, so that the focused endface image and the inspection report will then be saved into the external device with his/her notes or comments.

As can be seen from the above automatic inspection process of the inspection probe 10, instead of searching and settling its microscope system's optics to a focused position, the inspection probe 10 only requires the optics to 'scan through' the focused position. In fact, the memory 111 in the microprocessor 140, which can store in sequence a stack of endface image frames (along with their sharpness indexes), is dynamically refreshed with the image flow while scanning the microscope to focus on the endface 400; in the meantime, the CPU 110 closely monitors the trend in the changes of the image sharpness index, especially with closer tracking on the rising slope of the image sharpness index; once the image sharpness index passes the peak and starts falling down, the CPU 110 immediately stops refreshing the memory 111 and then picks up the best frame (with the highest sharpness index) from the image stack in the memory 111 as the focused image. Therefore it can be seen that, as long as the optics scanning passes the focus point, the focused image will surely be acquired. The advantages of this smart probe include:

- Unlike the probe disclosed in U.S. Pat. No. 9,217,688 B2, no motor and power driver is used in the inspection probe according to the present invention so that the inspection probe can maintain a compact size and a light weight as a decent hand-held device.
- Unlike the traditional focusing process which is a closed-loop operation to search and finally settle the microscope optics at the focused position, the focused image acquisition according to the present application is an open-loop operation without a feedback control on the position of the focusing knob 3401. Therefore, it allows a great time saving. An entire process only takes about a second or so.

Its focusing result is more objective since there is no need for the operator to judge where the best focused point is.

Its process is less sensitive to the operator's hand stability. As long as the fiber endface falls within the field of view of the camera sensor, the microprocessor 140 can always fetch a focused image because the camera sampling frequency is generally higher than human-hand shaking frequency. In other words, in normal cases the inspection probe according to the present invention should not miss the focus peak.

In principle, the transmission mechanism 340 in FIG. 1 for adjusting the position of the objective lens 310 can be manually-driven, electrically-driven, magnetically-driven, etc. FIG. 4 shows the main features of the transmission mechanism 340 according to an embodiment of the present invention, which is to convert a one-way rotary motion into a linear bi-directional reciprocating motion. As shown in FIG. 4A, when the focusing knob 3401 is rotating counter-clockwise along 3402, the mechanical lens drive bar 3404, through the transmission substructure 3403, is moving linearly and recurrently following the 3405 cycle. If the focusing knob 3401 is rotating clockwise along 3402' (see FIG. 4B), the mechanical lens drive bar 3404 will follow the 3405' cycle, with the same motion range. It can also be seen that, as long as the focused position is within this range, each full turn of the focusing knob 3401 will allow the focused position to be passed twice, thus resulting in a focused image on the camera module 200 twice.

Figure 5:
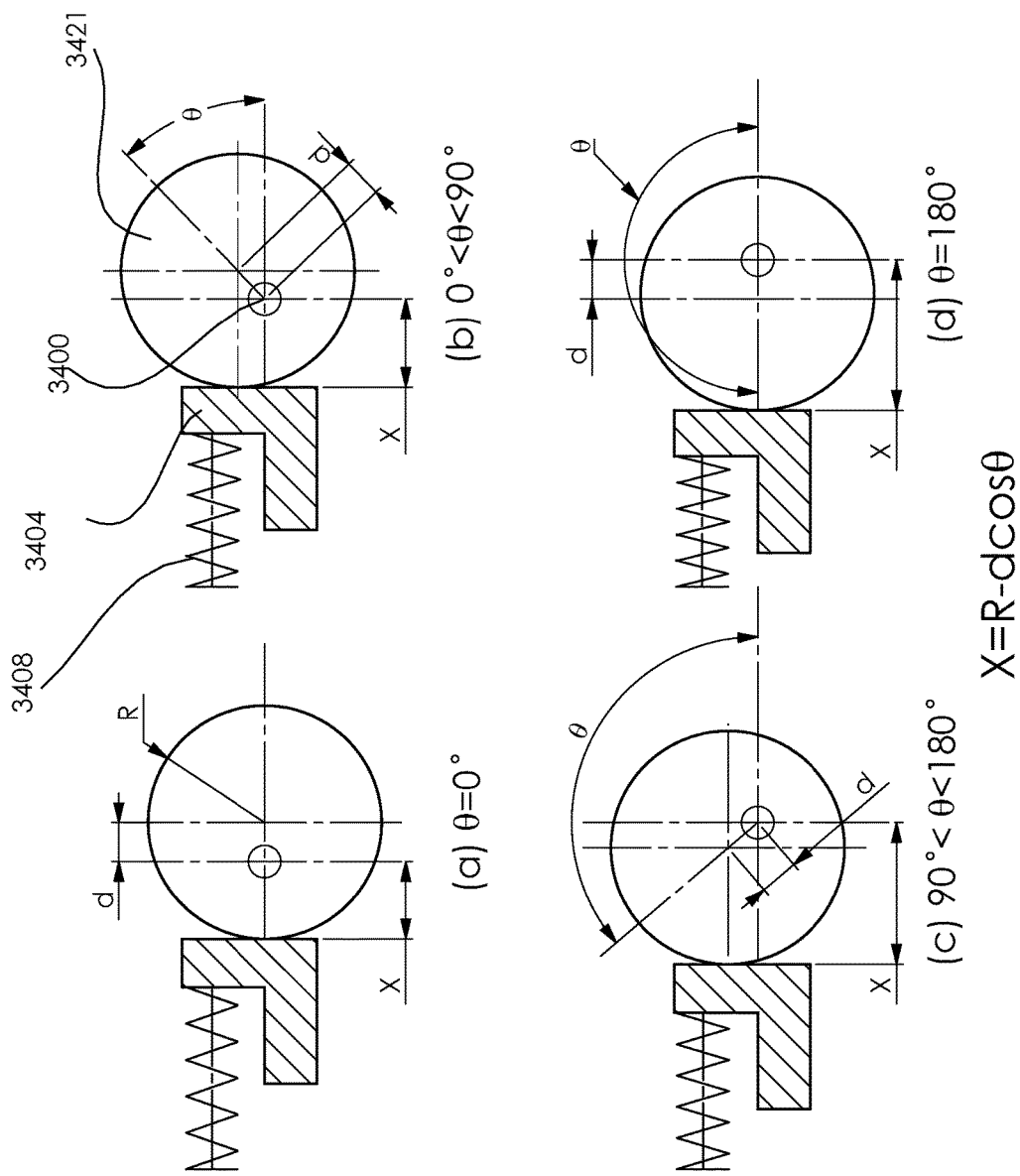
FIG. 5 illustrates the transmission mechanism embodied in an eccentric wheel.

FIG. 5 shows an example of the transmission substructure 3403. It is based on an eccentric wheel principle. The focusing knob 3401 has a round base 3421, but the round base 3421 is designed with an eccentrically positioned rotation shaft center 3400, with a center offset d. Therefore, with the rotation of the focusing knob 3401, the mechanical lens drive bar 3404 can be pushed back or forth by the spring 3408 or the base 3421 along the horizontal axis. (In an inspection probe, this horizontal axis is in fact the optical axis of the inspection probe.) Since the mechanical lens drive bar 3404 is mechanically attached to the lens holder (not shown), its movement directly leads to the movement of the objective lens 310, hence a focus adjustment. As shown in FIG. 5, when the focusing knob 3401 is rotated, the eccentric base 3421 is rotated eccentrically. As a result, the mechanical lens drive bar 3404 is driven closer or farther relative to the rotation shaft center 3400, with a variable distance x. This distance x is a function of the rotation angle $\theta$: $x = R - d \cdot \cos \theta$, where R is the radius of the round base 3421, d is its center offset, and $\theta$ is the rotation angle of the focusing knob 3401. Because $\cos \theta = \cos(360° - \theta)$, a full turn of the knob rotation ($\theta = 0 \sim 360°$) can bring the probe optics to pass through the focusing point twice. An ideal mechanical configuration should be designed such that the two $\theta$-angles for focusing point should be 180° apart. In other words, the focusing point should be aligned to $\theta = 90°$ and $\theta = 270°$, corresponding to x=R. In this case, the maximum rotation angle needed for passing the focus point is 180° only. Since this eccentric design of FIG. 5 offers a recurrent focusing evolution, the operator can choose to rotate the focusing knob 3401 in either direction, i.e. clockwise or counter-clockwise. But if he/she knows where the focusing zone is about, he/she may choose the shorter excursion.

Back to the embodiment in FIG. 3, with the rotation of the focusing knob 3401 once the inspection probe 10 enters the vicinity of the focusing point (say, a ±10° focusing zone) the blinking frequency of the LED status indicator 105 speeds up, alerting the operator to rotate more gently in this focusing zone. (The focusing zone can be relatively determined by the microprocessor 140, based on the image sharpness index of the received images.) With further rotation, when the focusing zone is passed, the blinking is back to its original frequency. In case the inspection probe 10 happens to be already in the focusing zone at the start of the inspection process, in order to avoid missing the peak focusing point, the LED status indicator 105 will still blink at a normal frequency so that the operator will continue to turn the focusing knob 3401 and thus exit this focusing zone first and then go through a full excursion over a focusing zone.

In order not to miss the best focused image, the focusing step may not be uniform. Once entering the focusing zone, the rotation speed of the focusing knob 3401 can be slightly slowed down, thus getting finer adjustment steps. Another possibility is to let the microprocessor 140 automatically increase its image sampling rate within the focusing zone.

As previously mentioned, in addition to the SM mode and the MM mode, a manual operation mode is also allowed as a third selection on the mode selection switch 102. This manual operation mode can be used for inspecting uncommon fibers or connectors, e.g. fibers with nonstandard core/cladding dimensions, or connectors for multiple fibers, etc. Since they are not covered by the IEC standard, an automatic inspection will not work. Under the manual mode, the inspection probe 10 is only responsible for wirelessly transmitting video streams or fiber endface image frames to an external display device. The operator has to find the focused position manually and also judge the image quality visually. Even for a standard SM or MM case, if preferred, the operator can also choose the manual mode for manually looking/focusing, capturing, and judging the images.

The LED indicator 105 in FIG. 3 is of a ring shape. This shape enables the operator to look at the LED indication from any direction: left or right side, top or bottom side of the inspection probe 10. Except in normal automatic inspection processes described above, this LED status indicator 105 is also used under the manual mode. For example, the LED status indicator 105 shows yellow-blinking while the focused position is being searched. Once the micro-touch multifunctional switch 103 is pressed, an endface image is captured and the external device receives the captured image. At this time the LED status indicator 105 becomes yellow-steady.

So it can be seen that the micro-touch multifunctional switch 103 is also used for other functions. Except being used for initiating an automatic inspection process, the micro-touch multifunctional switch 103 is also used for image capturing. Even under an automatic inspection mode (i.e. SM or MM), due to some abnormal features of the image, the automatic inspection process may encounter difficulty to reach a result. In that case, the operator can press the micro-touch multifunctional switch 103 to manually capture an image (assuming there is an external display wirelessly connected with the inspection probe 10 for monitoring the endface image stream).

Figure 6:
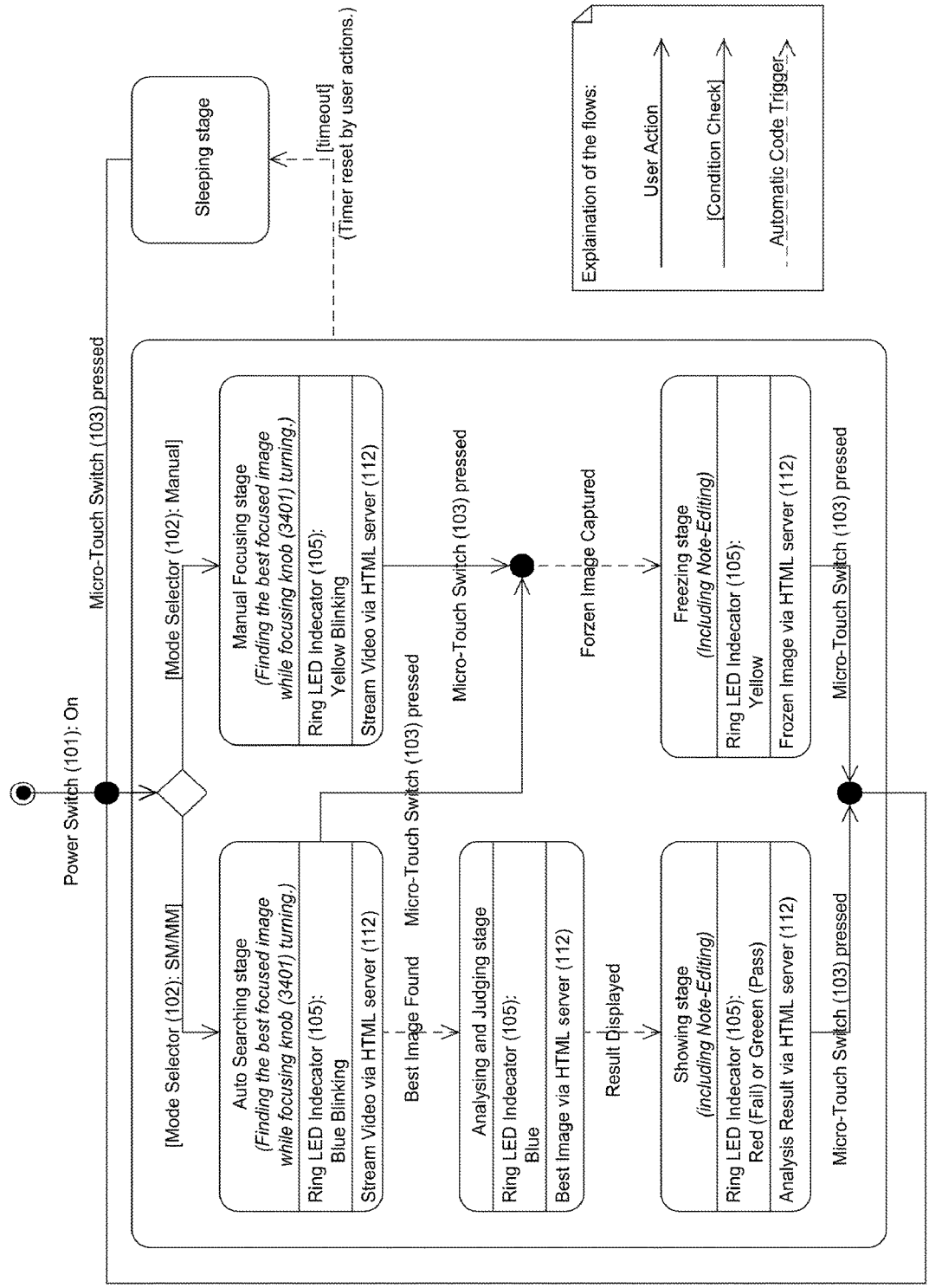
FIG. 6 shows the main working flowchart of the inspection probe according to the present invention.

Another function of the micro-touch multifunctional switch 103 is to wake up the probe while the inspection probe 10 is under the energy-saving sleeping mode. The preferred embodiment of the inspection probe 10 includes a power saving feature. When a set timer (say, 5 minutes) is timed out, the inspection probe 10 will fall into the sleeping mode. Under the sleeping mode, except that the microprocessor 140 keeps monitoring any human action, all other functions are shut down. A human action (such as any setting change on the mode selection switch 102, any pressing on the micro-touch multifunctional switch 103, etc.) will reset the countdown timer. FIG. 6 shows the main working flowchart of the inspection probe 10.

The preferred embodiment also includes a Wi-Fi on/off switch 104 for turning ON or OFF the wireless transmitter 114. In order to save the battery power, always set the Wi-Fi on/off switch 104 to OFF if there is no external display to work with under an automatic inspection mode.

In a wireless signal transmission, the image frame rate is related to the image size. In some embodiments, in order to show a smooth video stream on the display during focus scanning, a lower image resolution with a higher frame rate can be adopted but the acquired fixed image is still delivered with a full resolution. For example, for a 5M pixel digital camera, the frame rate can be as high as 20 fps with a resolution of 640×480, but the acquired fixed image is still delivered with a full resolution as 2560×1920. Then, the acquired full-resolution image can be easily customized and stored/updated by the microprocessor 140, for example, by performing a proper picture crop; or creating a picture showing both the cropped endface picture and also the original full image with the cropping frame indicated. In addition, the picture can also open a Note window for operator to input notes or comments.

As described above, the operation status of the inspection probe 10 is indicated by various different lighting effects, such as different colors, steady lighting or blinking at different frequencies. In an embodiment, sound effects (e.g. sounding a buzzer) are also used as an alternative or auxiliary status indicator.

In another embodiment, the inspection probe 10 includes an Ethernet output port (say, RJ45 receptacle), say, on its back. Using an Ethernet cable, the inspection probe 10 can be converted to a wired inspection probe to work with an external display. This may be very helpful in some working environments where wireless signals are forbidden. Since most display devices have USB type of connector port(s) instead of RJ45 type, as a useful configuration, the inspection probe 10 may contain a built-in USB/OTG Ethernet network adapter and a USB receptacle as the probe output port. Thus, the inspection probe 10 can easily be connected to an external display using a standard USB cable. Under this configuration, the probe may even get power supply from the display through the USB connection (if the display has sufficient power capacity to support).

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A fiber optic endface inspection probe, comprising:
   a microscope system including a microscope optical system and a transmission mechanism for moving objective lens in the microscope optical system;
   an adapting tip disposed at a front side of the microscope optical system for mating with an external fiber optic connector having an endface and an optical fiber embedded therein;
   a camera module disposed at a rear side of the microscope optical system for taking endface images of the fiber optic connector through the microscope optical system;
   an image processing system, comprising a microprocessor with a memory, for receiving and analyzing the endface images taken by the camera module;
   a wireless transmitter for optionally transmitting data from the image processing system in a webpage format to an external electronic device; and
   a multifunctional LED indicator for indicating prevailing operation statuses of the endface inspection probe,
   wherein the endface inspection probe is configured to be capable of performing the following steps for a fiber optic connector mated with the adapting tip:
   (a) upon starting an endface inspection run, initializing the memory in the image processing system;
   (b) while the transmission mechanism is continuously moving the objective lens of the microscope optical system, the camera module continuously taking endface images of the fiber optic connector, and the image processing system continuously receiving the endface images;
   (c) the microprocessor of the image processing system calculating an image sharpness index for each of the endface images received from the camera module;
   (d) storing in the memory a stack of endface images and the corresponding image sharpness indexes, and continuously refreshing the memory with newly received endface images and corresponding image sharpness indexes;
   (e) the microprocessor monitoring changes in the image sharpness indexes of the endface images received to determine whether a peak value has occurred among the image sharpness indexes, wherein the peak value is deemed to have occurred when the image sharpness index of a newly received endface image starts to fall immediately following a sequence of incrementally rising image sharpness indexes while the transmission mechanism is driven in a same direction; and
   (f) once it is determined that a peak value has occurred among the image sharpness indexes, the image processing system stopping refreshing the memory and identifying, from the stack of endface images in the memory, the endface image with the peak value as a focused endface image; and the multifunctional LED indicator signaling that a focused endface image has been identified.

2. The fiber optic endface inspection probe as claimed in claim 1, wherein the microprocessor is capable of further performing, after a focused endface image is identified in step (f), the step of:
   (g) processing the focused endface image to locate the optical fiber in the endface image, obtaining a cropped focused image covering the optical fiber's ABCD zones with the optical fiber at a center thereof, and analyzing an area in the cropped focused image surrounding the optical fiber against a certain fiber optic endface inspection standard to determine whether the endface passes or fails inspection per the endface inspection standard; then the multifunctional LED indicator signaling the pass/fail determination; and generating an endface inspection report in a webpage format including the cropped focused image and the pass/fail determination.

3. The fiber optic endface inspection probe as claimed in claim 2, wherein steps (a) to (g) are performed automatically without human interaction.

4. The fiber optic endface inspection probe as claimed in claim 2, wherein steps (a) to (g) are performed automatically without human interaction, except that in step (b) the transmission mechanism is driven by an operator manually turning a focusing knob to move the objective lens of the microscope optical system.

5. The fiber optic endface inspection probe as claimed in claim 2, wherein the endface images taken in step (b), the focused endface image identified in step (f) and the endface inspection report obtained in step (g) are transmitted via the wireless transmitter in a webpage format to an external electronic device to be shown on a display thereof.

6. The fiber optic endface inspection probe as claimed in claim 2, further comprising a fiber mode selection switch for an operator to select a single-mode operation or a multimode operation according to whether the fiber optic connector is a single-mode (SM) fiber or a multimode (MM) fiber.

7. The fiber optic endface inspection probe as claimed in claim 1, wherein the endface images taken in step (b) are transmitted via the wireless transmitter in a webpage format to an external electronic device to be shown on a display thereof for an operator to manually identify a focused endface image and visually inspect the endface.

8. The fiber optic endface inspection probe as claimed in claim 1, further comprising an inspection mode selection switch for an operator to select an automatic inspection mode or a manual inspection mode for an endface inspection run, wherein under the automatic inspection mode, the endface inspection run performs steps (a) to (f); and
   (g) processing the focused endface image to locate the optical fiber in the endface image, obtaining a cropped focused image covering the optical fiber's ABCD zones with the optical fiber at a center thereof, and analyzing an area in the cropped focused image surrounding the optical fiber against a certain fiber optic endface inspection standard to determine whether the endface passes or fails inspection per the endface inspection standard; then the multifunctional LED indicator signaling the pass/fail determination; and generating an endface inspection report in a webpage format including the cropped focused image and the pass/fail determination,
whereas under the manual inspection mode, the endface inspection run performs steps (a) and (b) and the step of:
   transmitting via the wireless transmitter the endface images taken in step (b) in a webpage format to an external electronic device to be shown on a display thereof for an operator to manually identify a focused endface image and visually inspect the endface.

9. The fiber optic endface inspection probe as claimed in claim 8, wherein, the inspection mode selection switch allows an operator to further select a single-mode operation or a multimode operation under the automatic inspection mode according to whether the fiber optic connector is a single-mode (SM) fiber or a multimode (MM) fiber.

10. The fiber optic endface inspection probe as claimed in claim 8, further comprising a multifunctional switch, which when pressed, will trigger one of the following actions: (1) if the inspection probe is currently performing an endface inspection run, whether under the automatic inspection mode or under the manual inspection mode, then terminating the endface inspection run and transmitting to an external electronic device via the wireless transmitter the endface image that has just been taken by the camera module at time the multifunctional switched is pressed; (2) if the inspection probe is currently in an energy-saving sleeping mode, then waking up the inspection probe to be ready for a new endface inspection run, otherwise (3) starting a new endface inspection run under the automatic inspection mode.

11. The fiber optic endface inspection probe as claimed in claim 8, wherein the multifunctional LED indicator uses different lighting effects or sound effects to indicate prevailing operation statuses, wherein the operation statuses include:
   searching for a focused endface image under the automatic inspection mode,
   searching for a focused endface image under the manual inspection mode,
   a focused endface having been identified,
   the endface passing inspection,
   the endface failing inspection, and
   the inspection being idle but ready to start action.

12. The fiber optic endface inspection probe as claimed in claim 11, wherein the lighting effects include different colors, steady lighting or blinking, and different blinking frequencies.

13. The fiber optic endface inspection probe as claimed in claim 8, wherein the multifunctional LED indicator has a ring shape so that it may be viewed from different viewing angles.

14. The fiber optic endface inspection probe as claimed in claim 5, wherein the endface images taken in step (b) are transmitted via the wireless transmitter to the external electronic device in a resolution lower than a full resolution of the endface images stored in the memory of the image processing system, and the focused endface image identified in step (f) is transmitted to the external electronic device in the full resolution.

15. The fiber optic endface inspection probe as claimed in claim 5, wherein the focused endface image and the endface inspection report transmitted from the wireless transmitter includes a window for an operator to enter text prior to saving the focused endface image and the endface inspection report in the external electronic device.

16. The fiber optic endface inspection probe as claimed in claim 1, wherein the transmission mechanism is manually driven, electrically driven or magnetically driven.

17. The fiber optic endface inspection probe as claimed in claim 1, wherein the transmission mechanism comprises a rotating shaft with an eccentrically positioned center such that when the rotating shaft is driven to continuously rotate in a single direction (clockwise or counterclockwise), the rotating shaft interacts with a mechanical lens drive bar to cause the objective lens to move back and forth.

18. The fiber optic endface inspection probe as claimed in claim 1, further comprising an Ethernet output port or a USB output port for supporting wired transmission.

* * * * *